United States Patent
Al-Himyary et al.

(10) Patent No.: US 6,345,954 B1
(45) Date of Patent: Feb. 12, 2002

(54) DRY GAS SEAL CONTAMINATION PREVENTION SYSTEM

(75) Inventors: Thair J. Al-Himyary; Jonathan D. Carlson, both of Calgary (CA)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/253,253

(22) Filed: Feb. 19, 1999

Related U.S. Application Data

(63) Continuation of application No. 08/800,995, filed on Feb. 20, 1997, now abandoned, which is a continuation-in-part of application No. PCT/CA96/00418, filed on Jun. 18, 1996.
(60) Provisional application No. 60/000,499, filed on Jun. 23, 1995.

(51) Int. Cl.$^7$ .................................................. F01D 11/00
(52) U.S. Cl. .................... 415/112; 415/111; 415/230; 415/172.1; 415/26; 277/927; 277/318; 277/320; 277/408
(58) Field of Search ............................... 415/110, 111, 415/112, 229, 230, 168.1, 168.2, 170.1, 172.1, 1, 26, 27, 17; 277/927, 318, 320, 408

(56) References Cited

U.S. PATENT DOCUMENTS

| | | |
|---|---|---|
| 2,820,652 A | 1/1958 | Oechslin |
| 2,903,970 A | 9/1959 | Elovitz et al. |
| 3,069,173 A | 12/1962 | Best |
| 3,508,758 A | 4/1970 | Strub |
| 3,949,996 A | 4/1976 | Inoue et al. |
| 4,005,580 A | 2/1977 | Swearingen |
| 4,058,320 A | 11/1977 | Kosanovich ................ 277/927 |
| 4,497,172 A | 2/1985 | Smith |
| 4,629,196 A | 12/1986 | Joniec ........................ 277/408 |
| 4,688,806 A | 8/1987 | Heilala |
| 4,739,997 A | 4/1988 | Smetana |
| 4,993,917 A | 2/1991 | Kulle et al. .................. 415/112 |
| 5,028,204 A * | 7/1991 | Kulle et al. .................. 415/112 |
| 5,171,022 A | 12/1992 | Fessmann |
| 5,412,977 A | 5/1995 | Schmohl et al. |
| 5,474,304 A * | 12/1995 | Daiber et al. ................ 277/927 |

FOREIGN PATENT DOCUMENTS

| | | |
|---|---|---|
| CH | 365477 | 12/1962 |
| WO | WO 91/14853 | 10/1991 |
| WO | WO 94/15100 | 7/1994 |

OTHER PUBLICATIONS

"Dry Seal Applications in Centrifugal Compressors", by M. J. Fischbach, published Oct. 1989.

* cited by examiner

Primary Examiner—Edward K. Look
Assistant Examiner—Richard Woo
(74) Attorney, Agent, or Firm—Killworth, Gottman, Hagan & Schaeff LLP

(57) ABSTRACT

A seal gas pressure booster system for use with a gas compressor, particularly of the type used for boosting pressure in gas transmission, process or utility industries and which contains pressure about the shaft/casing interface with the use of dry gas seals. Seal supply gas is supplied from the discharge side of the compressor. During normal operation, sufficient head across the compressor exists to supply the necessary flow of seal supply gas against the restrictions provided by the filters, interconnections and components in the seal gas supply system. During startup, or during modes of operation where sufficient head across the compressor does not exist, the pressure booster system increases the pressure of a stream of compressor discharge gas to provide the necessary pressure differential to supply the dry gas seal with a continuous flow of clean, filtered gas.

14 Claims, 3 Drawing Sheets

DRY GAS SEAL CONTAMINATION PREVENTION SYSTEM

CROSS-REFERENCED TO RELATED APPLICATIONS

This application is a continuation of Ser. No. 08/800,995 filed Feb. 20, 1997, abandoned which is a continuation-in-part of PCT/CA96/00418 filed Jun. 18, 1996, which claims priority to Provisional Application Serial No. 60/000,499 filed Jun. 23, 1995.

FIELD OF THE INVENTION

This invention relates to improved systems for preventing contamination of dry gas seals, which require a continuing or non-interrupted flow of clean seal gas into and across the relatively moving faces of the dry gas seal.

BACKGROUND OF THE INVENTION

Dry gas seals are used in various applications such as centrifugal compressors and pumps as well as axial flow compressors, and especially compressors which operate at high pressures, such as compressors used in gas transmission, process or utility industries for boosting gas pressure.

In most types of compressors commonly used for boosting pressure in gas transmission, process or utility industries, one or more centrifugal or axial flow impellers are mounted on a shaft and form a rotor which rotates within a gas space in the compressor housing thereby to move gas from a suction inlet to a discharge outlet of the space. The shaft may be of the beam type wherein the impeller or impellers are mounted between two radial bearings. Alternatively, the shaft may be of the overhung type wherein the impeller or impellers are cantilevered from the two radial bearings. Any such compressor is usually coupled to a gas or steam turbine or an electric motor which provides the rotational drive power.

In such compressors, all of the space in which the impellers operate is pressurized to at least the pressure of the gas to be boosted, which in turn is dependent upon the process but which can be anywhere from several hundred to several tens of thousands of kPa. Leakage of the gas into the bearing cavity is controlled by seals. Dry gas seals are becoming the standard of choice in an increasing number of applications over older technology such as oil film seals. In dry gas seals, the sealing function is provided by a very thin film of gas which is permitted to pass between two relatively rotating annular surfaces. The leakage across the faces of such dry gas seals is quite low even when the pressure differentials are quite high.

Essential to effective, efficient and reliable operation of such dry gas seals is the provision of a steady supply of clean gas, free of contamination which could otherwise migrate between the relatively rotating annular seal surfaces and damage the surface of one or both of them due to abrasion. Such abrasion can cause a disruption in the ability of the relatively rotating annular faces to form a stable sealing film, or restrict the range of operating conditions over which such a sealing film may be reliably established, or otherwise degrade the measurable performance of the seal. Therefore it is desirable to prevent such contamination from migrating into the space where the dry gas seals are located.

A seal supply gas system is therefore provided in an effort to avoid the contamination problem, which system may or may not make use of the compressor process gas as the source. Regardless of the gas source, it is filtered and the volumetric flow regulated by some means, so as to provide the seal cavity with a steady supply of clean gas, at an optimum predetermined flow rate, conducive to reliable dry gas seal operation.

In cases where the source of the seal supply gas is the compressor process gas, the source is supplied from the discharge side of the compressor. During normal operation, this gas will have a higher pressure than the pressure in the seal cavities of both beam type and overhung type compressors. The potential then exists to drive the gas through the seal supply gas system, consisting of piping, connections, filters, valves and flow rate regulator. The gas will flow through this system and provide the seal cavity with a volume of clean gas such that the majority will flow through the seal cavity, across a labyrinth seal which separates the seal and process cavities, and thence back into the process cavity where it is re-compressed. Only a fraction of this volume will flow across the relatively rotating annular faces of the dry gas seals, and be vented, disposed of, or otherwise recaptured outside of the compressor casing.

During gas compressor operation in modes where a low pressure differential exists between the suction and discharge sides of the gas compressor, the aforementioned potential to drive the seal supply gas from the discharge side of the gas compressor through the seal supply gas system will not exist. This can occur during the startup sequence of the compressor. In such modes of operation, the risk of process gas flowing backwards from the process cavity into the seal cavity is greatly increased. If this occurs, the risk of process contamination migrating into the seal cavity and between the relatively rotating annular faces of the dry gas seals is greatly increased. Contamination entering seal cavities during this operating mode has been known to be sufficient to damage the seal to such a degree as to render it inoperable.

The prior art provides various systems which attempt to introduce a continuous flow of pressurized seal gas into enclosed seal cavities for the purpose of keeping them free from contamination. However, none of them provide for a backup system to maintain the flow of seal gas in the event that the primary source of such pressurized seal gas becomes inoperable for whatever reason.

SUMMARY OF THE INVENTION

An object of the invention is to provide a system for preventing process contamination from entering the dry gas seal cavity, migrating into the moving parts of the dry gas seal itself, and causing degradation in seal performance, or failure thereof in the course of certain varying conditions, e.g. compressor output pressure fluctuations, which may be encountered during operation.

In accordance with the invention in one aspect there is provided in combination, a turbomachine having a rotor therein, the rotor having a dry gas seal associated therewith, and a primary seal gas supply system adapted to supply a flow of seal gas to the dry gas seal when a sufficient pressure differential exists as to maintain that flow, the primary seal gas supply system having an upstream section adapted to be connected to a primary source of the gas and a downstream section connected to the dry gas seal, a one-way valve between the upstream and downstream sections preventing a back flow of gas from the downstream section into the upstream section; and a seal gas pressure booster system including a booster compressor having a gas inlet line connected to the upstream section of the primary seal gas supply system and a gas outlet line connected to the downstream section of the primary seal gas supply system for boosting the pressure of the gas using said primary seal gas supply in the downstream section sufficiently to ensure a continuing flow of seal gas to the dry gas seal during periods when there is an insufficient seal gas pressure differential associated with the primary system as to maintain the desired flow of seal gas therein, means for producing a signal indicative of insufficient seal gas pressure differential, and means associated with the booster compressor for driving the latter to boost the gas pressure in the downstream section in response to the signal.

In accordance with the invention in a further aspect there is provided a method of boosting seal gas pressure in a seal gas supply system for a turbomachine having a rotor therein equipped with a dry gas seal, the seal gas supplying system having an upstream section connected to a primary source of the gas and a downstream section connected to the dry gas seal, a one-way valve between the upstream and downstream sections preventing a back flow of gas from the downstream section into the upstream section; the seal gas pressure boosting method including providing a booster compressor having a gas inlet line to the upstream section and a gas outlet line connected to the downstream section sensing differential pressures between an inlet and an outlet of the turbomachine and producing a signal in response to the presence of a pre-selected differential pressure, and driving the booster compressor in response to the signal which is indicative of insufficient seal gas pressure differential associated with the primary seal gas supply system as to maintain adequate flow therein thereby to boost the pressure of the gas using said primary source of said gas in the downstream section sufficiently to ensure a continuing flow of seal gas to the dry gas seal.

In accordance with one embodiment, the invention is applied to a gas compressor having dry gas seals and a seal supply gas system wherein the source of seal supply gas is also the compressor discharge process gas, (which exists from time to time during operation at a pressure insufficient to overcome the flow losses associated with the seal supply gas system). The pressure booster system according to the invention detects this insufficient pressure by effecting a comparison with a predetermined setpoint, and upon detection, a valve opens to admit the gas normally used for the seal supply into a positive displacement booster compressor. This booster compressor raises the pressure of the seal supply gas to a level sufficient to overcome the flow losses associated with the seal supply gas system. The booster compressor continues operation until the operating mode of the gas compressor changes such as to provide a discharge pressure sufficient to provide the necessary potential to overcome the losses associated with the seal supply gas system. At this point, the positive displacement compressor shuts down, and seal supply gas is supplied as if the booster system were not present.

The seal gas pressure booster system is therefore particularly useful where the process gas in question contains contamination which has the potential to cause damage to the relatively rotating annular faces of the dry gas seal. Although dry gas seals come in a variety of configurations, which may include multiple stages, the booster system according to the invention is always situated to promote buffering of the first sealing stage of the dry gas seal from the process cavity.

BRIEF DESCRIPTION OF DRAWINGS

The invention will be more particularly described with reference to the accompanying drawings, in which.

DETAILED DESCRIPTION OF PREFERRED EMBODIMENTS

Figure 1:
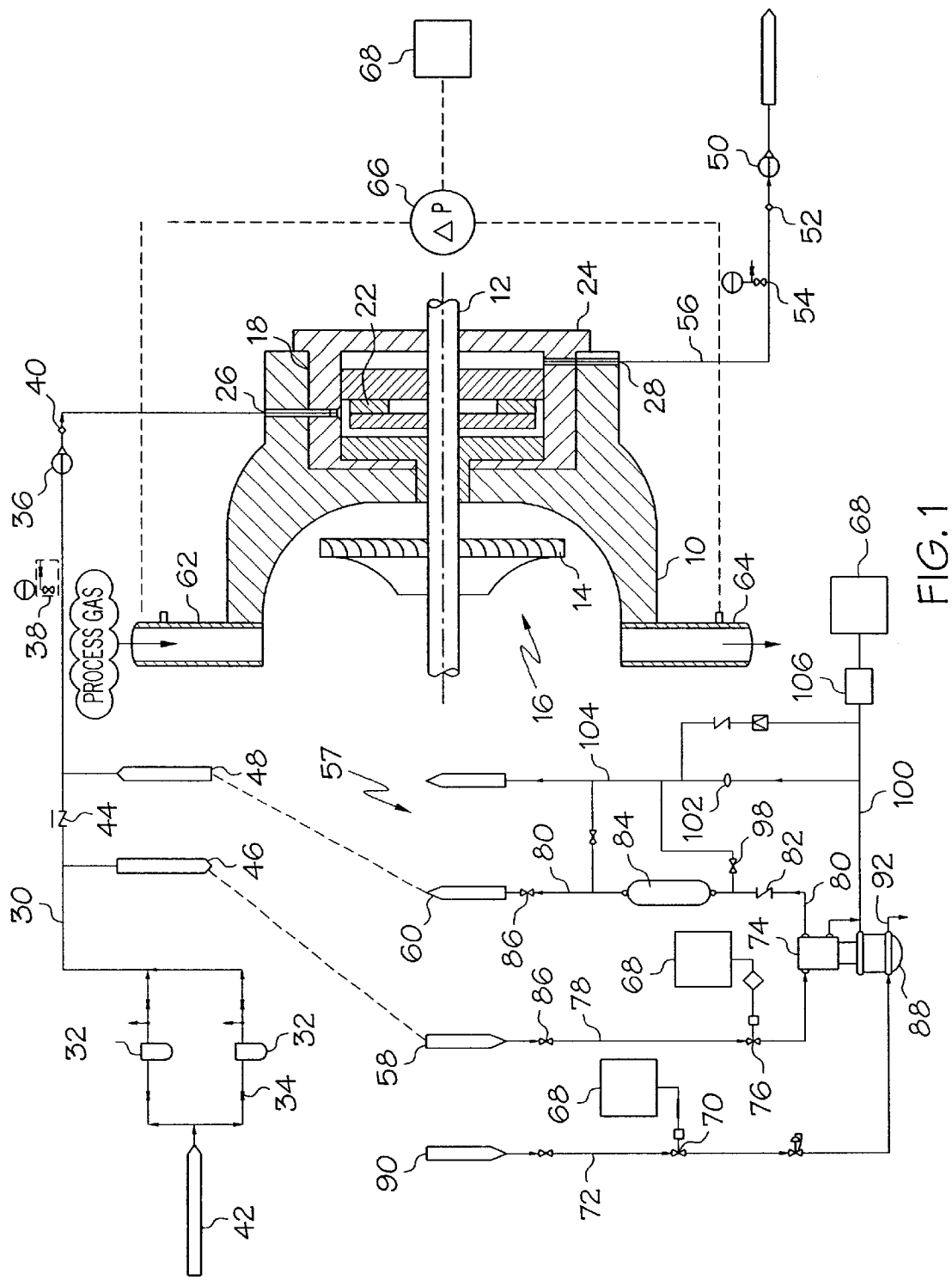
FIG. 1 is a schematic representation of a typical compressor in cross section having a seal supply gas system, together with interconnecting points for the booster system which is shown in the same figure, as a stand-alone addition, which connects to the existing seal supply gas system shown.

FIG. 1 includes a schematic representation of a portion of a gas compressor cross-section, limited to the process cavity, seal cavity and bearing cavity. The gas compressor has a casing 10, shaft 12 and impeller 14, contained within a process cavity 16, separated from a seal cavity 18 by a process cavity labyrinth seal 20. The seal cavity contains a dry gas seal 22 located within a seal housing 24. The seal housing has ports 26 and 28 for the introduction of seal supply gas and egress of seal leakage respectively. The gas compressor may or may not contain a multiple of impeller stages, or dry gas sealing stages.

A primary seal supply gas system is connected to the gas compressor and includes a supply line 30, two parallel filters 32, filter isolation valves 34, supply flow indicator 36, supply pressure indicator 38 and flow orifice 40. The primary source 42 of seal supply gas is typically the compressor process gas supplied from the discharge side of the compressor, the discharge pressure being subject to variations as described previously. Filter elements may be changed out during operation by isolating the filter element 32 requiring changeout with the valves, and directing the seal supply gas through the second filter 32. A one-way check valve 44 between the upstream side of the supply line 30 and the downstream side prevents reverse gas flow toward source 42. The flow rate of the seal supply gas may be measured either by the flow indicator 36 or the combination of flow orifice size and supply pressure indicator 38. The flow orifice 40 may also act as a means of regulation of the seal supply gas flow, or may be augmented by more sophisticated means, such as a regulating valve of some sort. These components are all mounted on a panel (not shown) adjacent to the gas compressor mounting skid. On this existing seal gas supply system are connection points 46 and 48 for hookup to the seal gas pressure booster system according to the invention.

Also located on this panel are components for monitoring of the leakage of gas from the dry gas seal 22 outwardly of port 28, including a visual flow indicator 50, flow orifice 52, and pressure transmitter 54 all located in leakage flow line 56. The combination of flow orifice size and pressure transmitter range enables a range of leakage flow to be measured.

The pressure booster system 57 is shown in FIG. 1 as a "stand alone" schematic, beginning with the connection point 58 to the primary seal supply gas system which is attached to connection point 46, while connection point 60 is attached to connection point 48 on the primary supply system. Operation of the booster system is activated by the detection of differential pressure across inlet 62 and outlet 64 of the gas compressor via differential pressure sensor 66 when it has dropped below a setpoint which has been predetermined and programmed into the gas compressor skid unit control system 68, usually consisting of a programmable logic controller. This setpoint represents the pressure differential necessary to allow seal supply gas to be driven through the seal supply gas system, including the filters, valves, piping, connections and other components before entering the seal cavity, plus a margin to allow for some variation in conditions.

It might be noted here that logic control system 68 is typically found on existing dry seal supply gas systems. Such installations usually serve to control the overall process skid, which typically would not only include the compressor but also the driver, which could be an electric motor, steam or gas turbine, or a diesel or gas engine. Currently the most common control device, as noted above, is a programmable logic controller well known per se, in the art as, for example an Allen-Bradley Model PLC-5.

Once the differential pressure has dropped below the setpoint a signal from the gas compressor skid unit control system actuates a solenoid valve 70 in supply line 72 into the open position, allowing a flow of drive fluid to begin operating the positive displacement boost compressor 74. At the same time this control signal opens solenoid valve 76 in compressor inlet line 78 to allow a flow of filtered seal gas to enter the boost compressor via connection points 46, 58 and compressor inlet line 78 where it is raised in pressure. It then flows via compressor outlet boost line 80 through a check valve 82, and into an accumulation vessel 84.

From the accumulation vessel 84 the gas is reintroduced into the downstream side of the primary seal supply gas system through the attached connection points 60 and 48. This pressure boost line 80 can be isolated from the seal supply gas system by valves 86, which are otherwise normally open. Check valve 44 prevents the pressure boosted seal gas from flowing upstream toward source 42. The boost compressor 74 is of the positive displacement type and is selected to meet the pressure and flow rate requirements of the system. It may, for example, be a Haskel Model AGD—4 positive displacement compressor.

Figure 2:
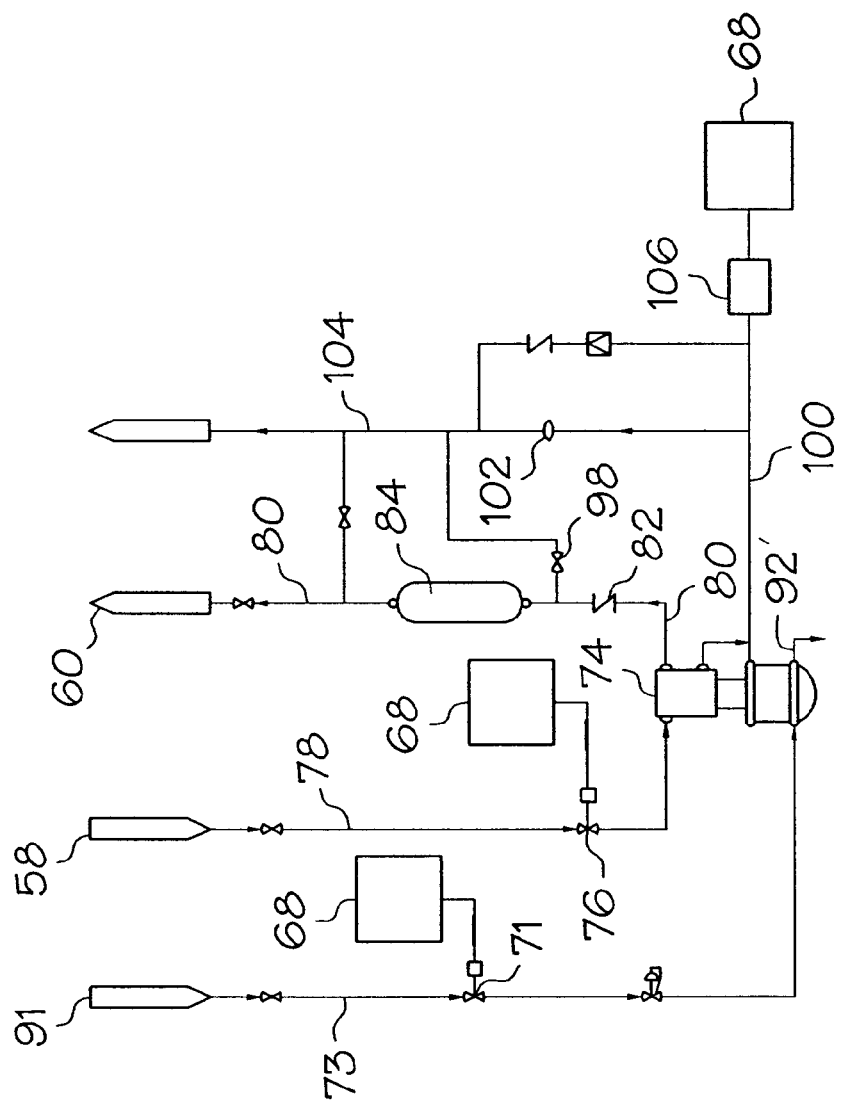
FIG. 2 shows a booster system similar to that of FIG. 1 except that the booster compressor has a hydraulic drive motor system.
Figure 3:
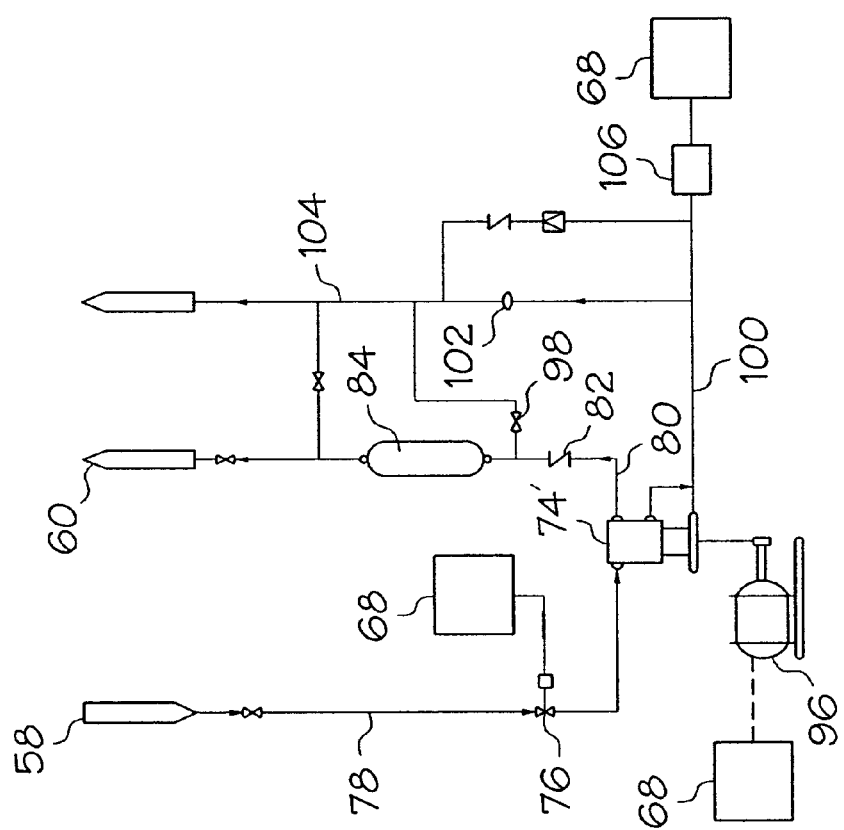
FIG. 3 shows a booster system similar to that of FIG. 1 except that the booster compressor has an electric drive motor system.

The boost compressor can be powered pneumatically, hydraulically or electrically. A pneumatic drive motor 88 is illustrated in FIG. 1, using process gas from the gas compressor, or gas from an external source such as compressed air or nitrogen, which source is connected to supply line 72 at connection point 90. After driving the displacement piston in the boost compressor, the drive fluid is vented via line 92, or recycled for repressurization and reuse. Hydraulic power is illustrated in FIG. 2, which is identical to FIG. 1, except for the hydraulic drive motor 94 driving the boost compressor 74. Hydraulic motor 94 is supplied from source 91 of hydraulic fluid via line 73 and control solenoid valve 71. Alternatively, compressor 74 may be driven by an electric motor 96, the starter for which may be interlocked with the signal from control system 68 that opens the solenoid valve 76 to commence the boost compressor operation. This alternative is shown in FIG. 3, which is identical to FIG. 1, except that the boost compressor is shown driven by an electric motor 96.

Several protection features are provided in this system. In the event the boost compressor discharge pressure becomes uncontrolled, and overpressure results, the seal supply gas line 80 is protected by a pressure safety relief valve 98. Also, the boost compressor 74 will normally have some nominal leakage across its internal seals. This leakage is vented into a header 100, where it flows through an orifice 102 before being vented to atmosphere via vent line 104, or otherwise recovered. The pressure upstream of this orifice is monitored by a pressure switch 106, the output of which is connected to the logic control system 68 for compliance with the nominal flow rate. In the event the internal seals of the boost compressor 74 fail for whatever reason, the sudden increase in pressure in vent header 100 will rise above a predetermined set point and initiate via switch 106 a shutdown of the system.

When the gas compressor operating conditions render the differential pressure across the gas compressor to be higher than the set-point below which the invention will commence operation, the overall compressor skid unit control system will initiate a signal that closes the solenoid valves 70, 71, 76 (or in the case of electric motor 96, turns the power off), which causes the pressure booster system to cease operation.

The invention is applicable to a wide variety of dry gas seals and applications, e.g. turbomachines such as gas compressors, turboexpanders, steam and gas turbines and centrifugal pumps.

Preferred embodiments of the invention have been described and illustrated by way of example. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

What is claimed is:

1. In combination, a turbomachine having a rotor therein, said rotor having a dry gas seal associated therewith, and a primary seal gas supply system adapted to supply a flow of seal gas to said dry gas seal when a sufficient pressure differential exists as to maintain that flow, said primary seal gas supply system having an upstream section adapted to be connected to a primary source of said gas and a downstream section connected to said dry gas seal, one-way valve between said upstream and downstream sections preventing a back flow of gas from the downstream section into said upstream section; and a seal gas pressure booster system including a booster compressor having a gas inlet line connected to said upstream section of the primary seal gas supply system and a gas outlet line connected to said downstream section of said primary seal gas supply system for boosting the pressure of the gas using said primary seal gas supply in said downstream section sufficiently to ensure a continuing flow of primary seal supply gas to said dry gas seal during periods when there is an insufficient seal gas pressure differential associated with said primary system as to maintain the desired flow of seal gas therein, means for producing a signal indicative of insufficient seal gas pressure differential, and means associated with said booster compressor for driving the latter to boost the gas pressure in said downstream section in response to said signal.

2. The combination according to claim 1 further including a valve in said booster compressor gas inlet line which also responds to said signal by opening said valve to allow an inflow of gas to said booster compressor.

3. The combination according to claim 2 wherein said turbomachine is selected from the group consisting of gas compressors, turbo expanders, steam and gas turbines and centrifugal pumps.

4. The combination according to claim 3 wherein said means for producing said signal includes a sensor responsive to differential pressure between an inlet and an outlet of said turbomachine.

5. The combination according to claim 4 including a line to receive any booster compressor leakage flow, and means for sensing excess pressure in said line.

6. The combination according to claim 4 wherein said means for driving said booster compressor comprises a fluid drive motor with a fluid inlet line connected to a source of fluid pressure for operating said drive motor, said fluid inlet line having a solenoid valve therein operable in response to said signal to activate said drive motor.

7. The combination according to claim 6 wherein said drive motor is a hydraulic motor.

8. The combination according to claim 6 wherein said drive motor is a pneumatic drive motor and the inlet line is connected to the primary source of gas pressure when in use.

9. The combination according to claim 4 wherein said means for driving said booster compressor is an electric motor.

10. The combination according to claim 4 wherein said gas outlet line has a one-way valve therein to prevent reverse flow through said line and said booster compressor.

11. The combination according to claim 10 wherein said gas outlet line has a pressure safety relief valve therein and an accumulator to accommodate surges in flow.

12. A method of boosting seal gas pressure in a seal gas supply system for a turbomachine having a rotor therein equipped with a dry gas seal, said seal gas supplying system having an upstream section connected to a primary source of said gas and a downstream section connected to said dry gas seal, a one-way valve between said upstream and downstream sections preventing a back flow of gas from the downstream section into the said upstream section; said seal gas pressure boosting method including providing a boosters compressor having a gas inlet line connected to said upstream section and a gas outlet line connected to said downstream section, sensing differential pressures between an inlet and an outlet of the turbomachine and producing a signal in response to the presence of a pre-selected differential pressure, and driving said booster compressor in response to said signal which is indicative of insufficient seal gas pressure differential associated with said primary seal gas supply system as to maintain adequate flow therein thereby to boost the pressure of the primary seal gas supply in said downstream section sufficiently to ensure a continuing flow of seal gas to said dry gas seal.

13. The method of boosting seal gas pressure according to claim 12 further including providing a valve in the booster compressor gas inlet line and opening said valve in response to said signal to allow an inflow of gas to said booster compressor.

14. The method of boosting seal gas pressure according to claim 13 when adapted for use with a turbomachine having a rotor therein having the dry gas seal associated therewith.

* * * * *

UNITED STATES PATENT AND TRADEMARK OFFICE
CERTIFICATE OF CORRECTION

PATENT NO. : 6,345,954 B1
DATED : February 12, 2002
INVENTOR(S) : Al-Himyary et al.

It is certified that error appears in the above-identified patent and that said Letters Patent is hereby corrected as shown below:

Column 3,
Line 22, "gas inlet line to the upstream" should read -- gas inlet line connected to the upstream --

Signed and Sealed this

Twenty-first Day of May, 2002

Attest:

Attesting Officer

JAMES E. ROGAN
Director of the United States Patent and Trademark Office